UNITED STATES PATENT OFFICE.

LEVIN T. BUCK, OF WEEMS, VIRGINIA.

FERTILIZER.

1,330,369.  Specification of Letters Patent.  Patented Feb. 10, 1920.

No Drawing.   Application filed September 30, 1919.  Serial No. 327,547.

*To all whom it may concern:*

Be it known that I, LEVIN T. BUCK, a citizen of the United States, residing at Weems, in the county of Lancaster and State of Virginia, have invented certain new and useful Improvements in Fertilizers, of which the following is a specification.

The present invention relates to a fertilizer and the method of preparing the same. It is well known that fish is rich in phosphorus, nitrogen and like constituents which are fairly nourishing to plant life, hence is desirable and advantageous as a fertilizer.

In preparing a fertilizer in accordance with the present invention, fish in its entirety or refuse is treated in bulk with quick lime in sufficient quantity to cook and dry the fish or its equivalent and the resultant mass absorbs the ammonia which is generated in the process which takes place in the treatment of the fish by the quick lime. The term "fish" is used in the sense of the fish in its entirety or parts thereof, such as the entrails, heads and other portions resulting from preserving or otherwise preparing fish for the market.

In accordance with the invention, the fish in mass has quick lime added thereto in sufficient quantity to thoroughly cook and dry the fish, so that the resultant product is free from moisture and in condition for use. It has been found that a great quantity of ammonia is generated during the cooking and desiccating process and this ammonia is absorbed by the product, thereby producing a fertilizer rich in plant nutriment.

All the free blood and water that is generally lost by drainage is saved by this process, as the lime in slacking absorbs the water and blood and at the same time the hot lime cooks the fish and also dries it and stops decomposition.

What I claim is:—

The herein described method of preparing fertilizer from fish which consists in adding quick lime in sufficient quantity to the fish to thoroughly cook and desiccate the same.

In testimony whereof I affix my signature in presence of two witnesses.

LEVIN T. BUCK.

Witnesses:
F. H. GUNBY,
F. A. GUNBY.